United States Patent [19]
Isenberg et al.

[11] 3,938,913
[45] Feb. 17, 1976

[54] FLOW MACHINE FOR AN AGGRESSIVE, RADIOACTIVE OR SPECIAL-PURITY FLOW MEDIUM

[75] Inventors: Gerhard Isenberg; Peter Bloch, both of Dachau; Wolfgang Tuzinsky, Munich, all of Germany

[73] Assignee: Maschinenfabrik Augsburg-Nurnberg Aktiengesellschaft, Germany

[22] Filed: Dec. 20, 1972

[21] Appl. No.: 316,899

[30] Foreign Application Priority Data
Dec. 20, 1971 Germany............................ 2163256

[52] U.S. Cl. ................................................. 417/356
[51] Int. Cl.² .......................................... F04B 17/00
[58] Field of Search....................... 310/61; 417/316

[56] References Cited
UNITED STATES PATENTS

| | | | |
|---|---|---|---|
| 3,143,972 | 8/1964 | Smith et al............................ | 417/356 |
| 3,218,981 | 11/1965 | Kierulf................................. | 417/356 |
| 3,273,506 | 9/1966 | Jamieson .............................. | 415/72 |
| 3,433,163 | 3/1969 | Sheets et al.......................... | 417/356 |

FOREIGN PATENTS OR APPLICATIONS

| | | | |
|---|---|---|---|
| 974,755 | 4/1961 | Germany............................. | 417/356 |
| 250,177 | 7/1926 | United Kingdom.................. | 417/356 |
| 1,315,645 | 12/1962 | France................................. | 417/356 |

*Primary Examiner*—C. J. Husar
*Attorney, Agent, or Firm*—Craig & Antonelli

[57] ABSTRACT
A flow machine for pumping and/or measuring the flow of agressive, radioactive, or special-purity flow mediums. The flow machine is provided with a rotatable impeller magnetically supported within a machine casing such that the impeller is spaced at all points from the inside walls of the machine casing. The casing inside walls and the outer configuration of the impeller include a central cylindrical center section joined by conically outwardly flared end sections. Electromagnetics are arranged in the conical flared section outside of the inside wall for cooperation with magnetic material arranged in the corresponding conically flared sections of the impeller to support the impeller in position. The conically flared section facilitate both radial and axial support of the impeller, since both axial and radial components of electromagnetic force is experienced at the conically flared sections of the impeller. Means are provided to detect the gaps around the circumference of the impeller between the impeller and the casing inside walls, which means provide signals to an electronic device for controlling the respective current supply to the electromagnets so as to assure the maintenance of a substantially uniform circumferential gap around the impeller for all operating conditions. In one embodiment, the flow machine is constructed as an axial flow pump driven by an asynchronous electric motor having a rotor formed around the cylindrical section of the impeller and a stator arranged outside of the inside walls along the cylindrical section thereof. A further embodiment of the flow machine is constructed as a flow meter which includes means for detecting the rotational speed of the impeller, which rotational speed is a direct function of the volumetric flow and/or velocity of the flow medium through the impeller.

28 Claims, 3 Drawing Figures

FLOW MACHINE FOR AN AGGRESSIVE, RADIOACTIVE OR SPECIAL-PURITY FLOW MEDIUM

BACKGROUND AND SUMMARY OF THE INVENTION

This invention relates to a flow machine and more particularly this invention relates to a turbopump or flow meter device having an impeller which provides a passage for an agressive, radioactive or special-purity flow medium and is radilly supported in the interior of the machine casing. This impeller is in most instances radially supported over its radially extreme circumferential area. The aggressive flow medium may be, f.i., an acid or one for the chemical or pharmaceutical industry, where the conveyance of extremely pure flow media is a frequent requirement.

Turbomachines of this general type have been contemplated where the flow duct of the machine, or an axial impeller bore connected to the flow duct for the passage of the flow medium, communicates with the bearing gap or bearing gaps of the radially arranged bearing during operation of the machine and where this flow medium serves as a bearing lubricant. The disadvantage affecting this solution is that such a flow medium is very often ill-suited as a bearing lubricant generally or at least in many instances is ill-suited for the particular bearing or the material of its running surface. For example, numerous materials used for running surfaces are subject to attack by certain aggressive flow media.

Likewise a vertically arranged rotor has been contemplated which is restrained or axially supported by the attraction of a magnet arranged at its upper end.

A broad object of the present invention is to obviate the use of the flow medium as a bearing lubricant and equally to eliminate the necessity for a seal between the bearing gap and the flow area for preventing mutual contact or mixing of the flow medium with a bearing lubricant or contact of a bearing running surface material with the flow medium.

It is a particular object of the present invention to provide a flow machine where the radial bearing is free from mechanical contact by means of a magnetic device. The flow medium is here not used as a lubricant. The bearing properties may then be independent of the properties of the flow medium. Bearing lubricants, such as a liquid, are eliminated altogether. Special material for bearing running surfaces is not necessary since the bearing is free from contact, friction and wear, and the material can also not be attacked by the flow medium. Further, the need for said seal is eliminated in that sealing problems of this nature are removed. Mutual contact or mixing of a said flow medium with a bearing lubricant, such as a bearing oil, cannot take place; contamination of either medium by the other medium, mutual contamination or mutual chemical reactions are impossible. The aggressive, radioactive or special-purity flow medium may be allowed to dwell in or pass through the bearing gap. There is no need for keeping it away from the bearing gap. Nor does the impeller bearing require servicing.

Except to the inlet and outlet flow of the aggressive or similar flow medium the casing of the machine may be closed off against the outside. Shaft lead-ins in the casing to accommodate outboard bearings can be eliminated. Sealing problems connected therewith are likewise prevented. Inasmuch as a centrally arranged impeller shaft can be eliminated, the inlet area can be enlarged where the flow into the impeller is axial to it, which is of particular benefit to turbo processing machines.

The flow machine cited in the present invention is most often a turbo processing machine, more particularly a turbopump, or a turbine. This may be an axial-flow turbomachine, mixed-flow turbomachine or radial-flow turbomachine. The flow machine of the present invention may equally be a screw pump.

The flow machine cited in this invention may also be arranged for measuring the throughput of an aggressive, radioactive or special-purity flow medium by especially inductive measurement of the rotational speed of the impeller allowing passage to the flow, where this speed is a measure of the throughput. In this particular application of the invention the benefits discussed above are achieved as well. Also the function of speed is independent of bearing friction which would vary with speed.

DETAILED DESCRIPTION OF THE DRAWING

Figure 1:
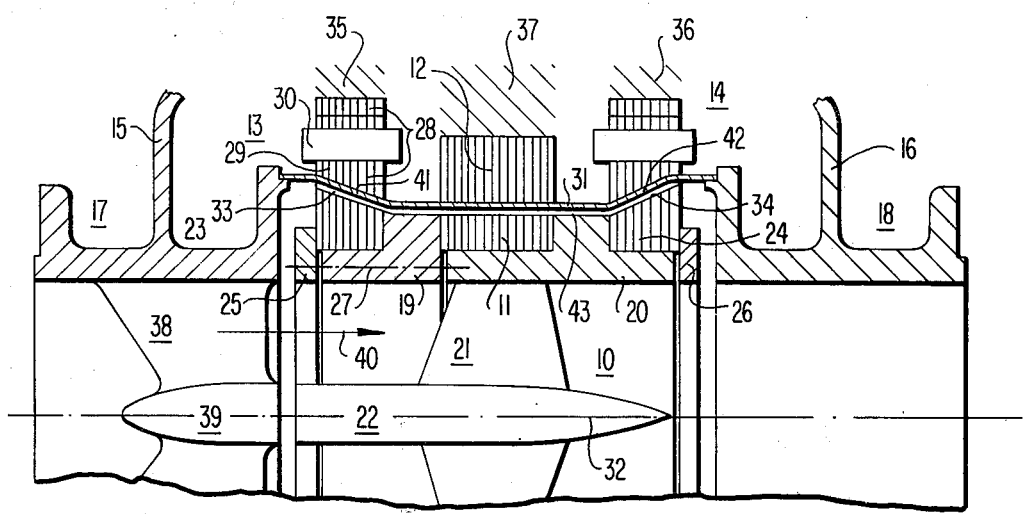
FIG. 1 is an elevation illustrating an embodiment of the flow machine arranged in accordance with the present invention, where the machine is an axial-flow turbine pump.

With respect to FIG. 1, the horizontally disposed impeller 10 of the pump, which is driven by an asynchronous (squirrel cage) motor having a rotor 11 revolving around the impeller 10 and a stator 12, is surrounded by stationary electromagnets 13 and 14. These electromagnets and the stator 12, are surrounded by a tubular cylindrical center section of the pump casing which is not shown in detail here. This center section extends coaxially with and over approximately the entire length of the impeller 10 and is axially bolted by its axial ends in the outer peripheral area of the end walls 15 and 16 of an inlet pipe 17 and an outlet pipe 18 of the casing to said pipes 17 and 18. The impeller 10 essentially consists of two axially successive, tubular cylindrical annular members 19 and 20 which are axially clamped together, of a row of impeller blades 21 and a guide body 22, where the annular member 20 of the impeller, the guide body 22 and the impeller blades 21 together form a rigid unit, and of two annular, coaxially arranged stacks of sheet 23 and 24, where the annular members 19 and 20 of the impeller are clamped one to the other by means of two clamping rings 25 and 26 and axial screws 27 through said stacks 23 and 24 and the rotor 11. The inlet pipe 17 has a row of stationary guide vanes 38 and a guide body 39. The direction of flow of the aggressive or similar medium through the flow duct of the pump is indicated by an arrowhead 40.

The electromagnets 13 and 14 are each spaced equally through a 360° arc, there being at least three and more preferably four each provided in this arrangement. One or more of these electromagnets is arranged in the upper area to sustain the weight of the impeller. As indicated by the hatchings 35 and 36, the electromagnets 13 and 14 are located in the center section of the pump casing, and this equally holds for the stator 12 (see hatching 37). The electromagnets 13 and 14 and the stacks of sheet 23 and 24 form a magnetic device for supporting the impeller 10 free from mechanical contact. Each of the electromagnets 13 and 14 essentially consists of a U-shaped stack of sheet 28, where the U-legs 29 succeed one another circumferentially, and of a winding 30 around the said stack of sheet 28. A coaxially arranged thin-walled tubular cylinder 31 which is centrally located against the inlet pipe 17 and the outlet pipe 18 serves among other functions to protect the electromagnets 13 and 14 and the stator 12 against the aggressive or similar flow medium. As it is indicated on the elevation, the pole faces 41 or 42, the tubular cylinder 31 in that area, and the outer circumference of the stack of sheet 23 or 24 extend at an angle with the centerline 32 of the impeller 10 and in parallel to each other. The resulting conical portions of the tubular cylinder 31 are in close proximity of the pole faces 41 or 42, and a cylindrical center section of the tubular cylinder 31 is arranged close to the inner circumference of the stator 12.

Present between the conical portions and the cylindrical center section of the tubular cylinder 31 on the one hand and the outer circumferential areas of the stacks of sheet 23 and 24 and the intervening cylindrical outer circumference of the impeller 10 and rotor 11 assembly on the other are the intercommunicating annular gaps 33, 34 and 43 and freedom from mechanical contact. The widths of these gaps, which extend normal to the impeller centerline, are in the order of magnitude of typically about 1 mm. Support in the absence of mechanical contact, that is, the particular position of the impeller 10, where the said width of the annular gap 33 or 34 is at least approximately equal through 360° arc, is achieved in that current is passed separately along each winding of the electromagnets 13 and 14, where the current passing along the windings of the electromagnets 13 and 14 in the upper area is of a superior intensity. These flows of current induce fixed electromagnetic fields of attraction which are equally spaced over 360° arc and permeate the respective electromagnets 13 or 14 and the stack 23 or 24. It is the corresponding magnetic attractions which sustain the impeller 10 in its said position.

Figure 2:
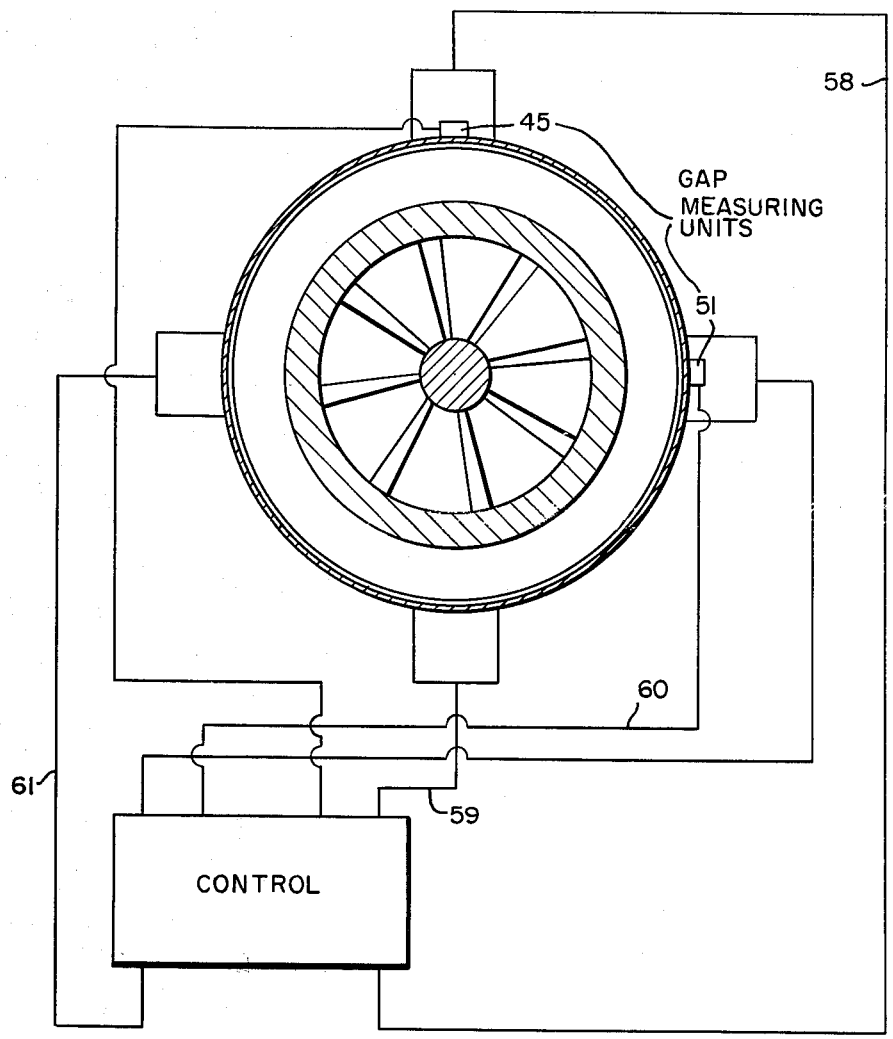
FIG. 2 is a schematic view of a control system for maintaining the impeller centered within the flow casing in accordance with the present invention.

Since the annular gaps 33 and 34 are not extending in parallel with the impeller centerline but flaring out in opposite directions, the impeller is not only located or supported radially but also located or supported axially to either side, for the reason that the magnetic forces acting vertically on each pole face 41 and 42 each have a radial and an axial component and that the axial components for the pole faces 41 and those for the pole faces 42 are oppositely directed. The arc of flare depends on the ratio of the radial to the axial forces (which ratio depends on various factors such as weight of impeller and axial thrust of flow medium on impeller). Provision of a single conically extending annular gap or of two oppositely arranged conical gaps (33 and 34) permits the impeller centerline (32) to be located in any desired position in space, more particularly in the horizontal. To keep the impeller centerline 32 of the impeller 10 in a central position and/or to offset imbalance or the like, use may be made of a device (illustrated schematically in FIG. 2) for the inductive or capacitative measuring of the gaps 33, 34, 43, without mechanical contact between the measuring device and the impeller, where the results of measurement are fed into an electronic unit which regulates the respective attraction forces of the electromagnets 13 and 14 by controlling the current supply to these electromagnets. Since measuring devices of known construction could inductively or capacitatively measure the gaps and provide electrical output signals corresponding to the measured values, details of such measuring devices 45 and 51 are not included herein. Further, since electronic units of known construction could regulate current flow in a plurality of lines associated with the respective electromagnets in response to signals from the measuring devices, details of such electronic devices are also not included herein. It will be understood that the measuring devices would be positioned so as to provide the necessary gap measurements to furnish sufficient control information to facilitate centering of the impeller during all operating conditions.

The flow machine in accordance with this invention eliminates electrical inlets or outlets between the impeller and the stationary portion of the pump. The asynchronous motor may be replaced by a hysteresis motor whose drive portion, f.i., in the stationary portion of the pump, is arranged to surround the impeller at one end and whose drive disc is seated in the shape of a ring on this end of the impeller, as in a radially extending annular impeller slot. A bearing gap of a bearing assembled in accordance with the present invention can be arranged in a radial-flow turbomachine and more particularly in a radial-flow processing machine axially adjacent to a rotor blade exit. When necessary, all parts in the machine contacting with aggressive or similar flow media in service may be given a protective coating as of teflon, glass or the like.

Figure 3:
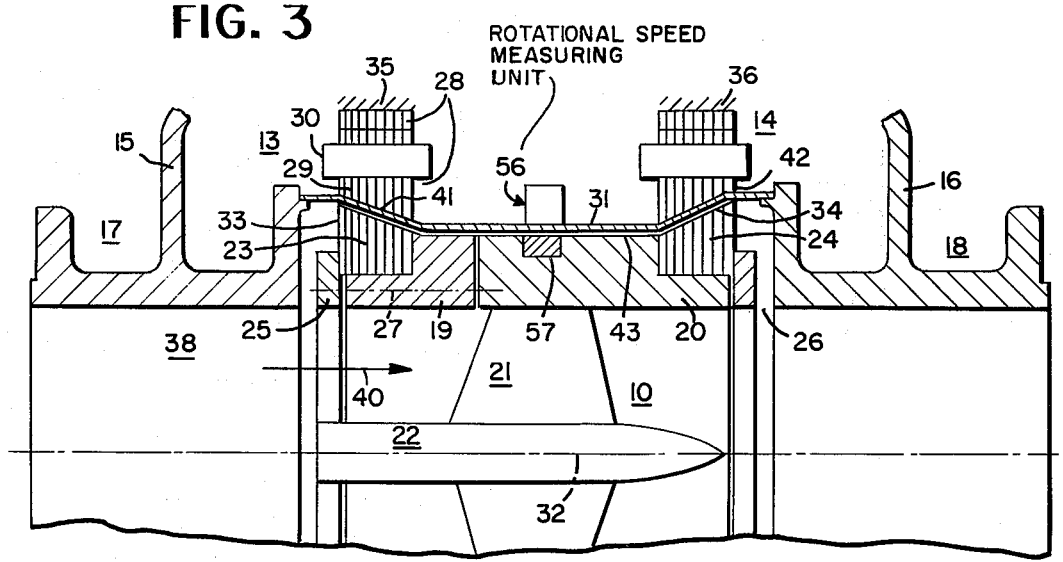
FIG. 3 is an elevation illustrating a modification of the flow machine which operates as a flowmeter.

The embodiment of the present invention constructed as a flowmeter (see FIG. 3) may be arranged such as the above-described axial-flow pump, except that the drive motor (11, 12) is eliminated and the row of guide vanes and the guide body (39) associated with it may be eliminated. The rotor blades of the flow meter are of a different shape than the blades of the axial-flow pump so as to accommodate the different flow metering function. Rotational speed measuring means 56 and 57 (which measuring means are of conventional construction in and by themselves) are provided for measuring the rotational speed of the impeller. The impeller speed may be precalibrated by other measuring devices to the expected range of volumetric flow or flow speeds of the fluid medium with which it is to be used. Once the functional relationship between the rotational speed of the impeller and the volumetric flow or velocity of the fluid medium has been established, the measurement of the rotational speed of the impeller can be used to directly determine the flow rate.

While we have shown and described only several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are known to those skilled in the art.

We claim:
1. A flow machine for aggressive, radioactive, or special-purity flow mediums comprising:
   machine casing means having inside walls which include a center section joined at both ends by re- spective conically outwardly flared sections,
rotatable impeller means with an outer configuration extending approximately parallel to said center section and said conical outwardly flared sections and arranged within said inside walls,
bearing support means for supporting said impeller means such that said impeller means is spaced at all points from the inside walls of said casing means, said bearing support means including magnetic material housed in the respective conical sections of said impeller means, a plurality of electro-magnets spaced from one another around the circumference of said inside walls, and electrical means for supplying electrical current to said electro-magnets, whereby both radial and axial support is provided to said impeller means by way of the respective components of magnetic force acting along the conical sections.

2. A flow machine according to claim 1, wherein the longitudinal centerline of said conical and cylindrical sections of said impeller and said inside walls extends horizontally, and wherein the electro-magnets near the top part of said inside walls are supplied with more electric current than said electro-magnets positioned closer to the bottom part of said inside walls so as to create a stronger magnetic force in the upper direction to counteract gravity forces acting on said impeller means.

3. A flow machine according to claim 1, wherein means are provided for controlling the current to each of said electro-magnets in response to measured variations in the distance between the outer surface of the impeller means and the inside walls, whereby said impeller means is automatically maintained in a central position with respect to said inside walls.

4. A flow machine according to claim 3, further comprising motor means for imparting rotation to said impeller means.

5. A flow machine according to claim 4, wherein said motor means is constructed as an electric motor with a rotor fixed to and arranged around the center section of said impeller means and a stator positioned around the outside of the center section of said inside walls of said casing means.

6. A flow machine according to claim 1, wherein said center section of said inside walls is cylindrical.

7. A flow machine for aggressive, radioactive, or special-purity flow mediums comprising:
machine casing means having inside walls, said inside walls including a center section joined at least at one end by a conically outwardly flared section,
rotatable impeller means arranged within said inside walls, said impeller means having an outer configuration which extends approximately parallel to said center section and said at least one conically outwardly flared section.

8. A flow machine according to claim 7, wherein said inside walls and said impeller means are spaced from one another about the circumference of the impeller means by a uniform annular gap along said center section and said conically outwardly flared section.

9. A flow machine according to claim 8, wherein said uniform annular gap is approximately 1 mm wide.

10. A flow machine according to claim 7, further comprising motor means for imparting rotation to said impeller means.

11. A flow machine according to claim 10, wherein said motor means is constructed as an electric motor with a rotor fixed to and arranged around the center section of said impeller means and a stator positioned around the outside of the center section of said inside walls of said casing means.

12. A flow machine according to claim 7, wherein said flow machine is constructed as a flow meter including means for detecting rotational movement imparted to said impeller means by the flow medium.

13. A flow machine according to claim 7, wherein the center section of the inside walls is joined at both ends by respectively oppositely conically outwardly flared sections.

14. A flow machine according to claim 13, further including bearing support means for supporting said impeller means such that said impeller means is spaced at all points from the inside walls of said casing means, said bearing support means including magnetic material housed in respective conical sections of said impeller means and electromagnetic means within said casing such that both radial and axial support is provided to said impeller means by way of the respective components of magnetic force acting along the conical sections.

15. A flow machine according to claim 7, wherein electromagnetic support means are provided for supporting said impeller means such that said impeller means is spaced at all points from the inside walls of said casing means.

16. A flow machine according to claim 15, wherein said electromagnetic support means have conical pole shoe faces which face the at least one conically outwardly flared section of said impeller means.

17. A flow machine according to claim 15, wherein said center section of said inside walls includes a thin-walled tubular cylinder to separate at least the center section of said inside walls from the flow mediums.

18. A flow machine according to claim 15, wherein said center section of the inside walls is cylindrical.

19. A flow machine according to claim 15, wherein said electromagnetic support means include electromagnets housed in said casing.

20. A flow machine according to claim 19, wherein magnetic material is housed in the impeller means within the conical sections thereof and face similarly disposed electromagnets in said inside walls along faces which extend substantially parallel to the inside wall conical sections.

21. A flow machine according to claim 20, wherein said magnetic material includes magnets.

22. A flow machine according to claim 19, wherein the longitudinal center line of said impeller and said inside walls extend horizontally, and wherein said electromagnets housed in said casing are spaced from one another around the periphery of said inside walls, and electrical means are provided for supplying electrical current to said electromagnets, with electromagnets near the top part of said inside walls being supplied with more electric current than electromagnets positioned closer to the bottom part of said inside walls so as to create a stronger magnetic force in the upward direction to counteract gravity forces acting on said impeller means.

23. A flow machine according to claim 22, wherein means are provided for controlling the current to each of said electromagnets in response to measured variations in the distance between the outer surface of the impeller means and the inside walls, whereby said impeller means is automatically maintained in a central position with respect to said inside walls.

24. A flow machine according to claim 7, wherein said outer configuration is closest to said inside walls.

25. A flow machine according to claim 7, wherein said outer configuration faces said inside walls.

26. A flow machine according to claim 7, wherein said rotatable impeller means has inside walls which cooperate with portions of said casing means inside walls to define a flow passage for the flow mediums.

27. A flow machine for aggressive, radioactive, or special-purity flow mediums comprising: machine casing means having electromagnetic means between which a rotor means is disposed, said electromagnetic means having pole faces which extend conically outwardly in parallel relationship with an outer wall of said rotor means, wherein said electromagnetic means form bearing support means for said rotor means.

28. A flow machine according to claim 27, wherein said electromagnetic means have pole faces which extend oppositely, conically outwardly in parallel spaced relationship with said rotor means outer wall.

* * * * *